(12) United States Patent
Wang et al.

(10) Patent No.: US 11,861,793 B2
(45) Date of Patent: Jan. 2, 2024

(54) METHOD FOR MERGING SURFACE SKIN THREE-DIMENSIONAL DATA

(71) Applicant: Hunan University, Hunan (CN)

(72) Inventors: Yaonan Wang, Hunan (CN); He Xie, Hunan (CN); Hui Zhang, Hunan (CN); Jianxu Mao, Hunan (CN)

(73) Assignee: Hunan University, Hunan (CN)

( * ) Notice: Subject to any disclaimer, the term of this patent is extended or adjusted under 35 U.S.C. 154(b) by 0 days.

(21) Appl. No.: 18/348,369

(22) Filed: Jul. 7, 2023

(65) Prior Publication Data

US 2023/0386134 A1   Nov. 30, 2023

Related U.S. Application Data

(63) Continuation of application No. PCT/CN2022/101099, filed on Jun. 24, 2022.

(30) Foreign Application Priority Data

May 24, 2022 (CN) .......................... 202210560489.2

(51) Int. Cl.
 *G06T 17/20* (2006.01)
(52) U.S. Cl.
 CPC .................... *G06T 17/20* (2013.01)
(58) Field of Classification Search
 None
 See application file for complete search history.

(56) References Cited

U.S. PATENT DOCUMENTS

| 2008/0062171 | A1 | 3/2008 | Kim | |
| 2019/0258225 | A1* | 8/2019 | Link | G05B 19/4097 |
| 2019/0259177 | A1* | 8/2019 | Hoelscher | G06V 10/44 |

(Continued)

FOREIGN PATENT DOCUMENTS

| CN | 104867136 | 8/2015 |
| CN | 111583318 | 8/2020 |

(Continued)

OTHER PUBLICATIONS

Jiaolong Yang et al., "Go-ICP: A Globally Optimal Solution to 3D ICP Point-Set Registration", IEEE Transactions on Pattern Analysis and Machine Intelligence, May 11, 2016, pp. 1-14.

(Continued)

*Primary Examiner* — Sultana M Zalalee
(74) *Attorney, Agent, or Firm* — JCIPRNET

(57) ABSTRACT

A method for merging surface skin three-dimensional (3D) data includes the following steps: 1. constructing actually-measured 3D data of a workpiece and 3D data of a design model of the workpiece; 2. calculating a normal vector, a neighborhood radius, and a position of a sphere center of each point in the design model 3D data; 3. finding closest points to the design model 3D data for all points in the actually-measured 3D data; 4. calculating a static closest distance and a dynamic closest distance from each point in the actually-measured 3D data to the closest point in the design model 3D data; 5. constructing an objective function of a surface adaptive distance; 6. minimizing the objective function and calculating a differential motion screw; and 7. updating the actually-measured 3D data and achieving data merging.

18 Claims, 3 Drawing Sheets

(56) References Cited

U.S. PATENT DOCUMENTS

2022/0019762 A1    1/2022  Kosuge et al.
2022/0036653 A1*   2/2022  De Somere ............. G06T 19/20

FOREIGN PATENT DOCUMENTS

CN     112132752    12/2020
CN     113628262    11/2021

OTHER PUBLICATIONS

C. Matabosch et al., "Registration of surfaces minimizing error propagation for a one-shot multi-slit hand-held scanner", Pattern Recognition, vol. 41, Issue 6, Jun. 2008, pp. 2055-2067.
Jihua Zhu et al., "3DMNDT: 3D Multi-View Registration Method Based on the Normal Distributions Transform", IEEE Transactions on Automation Science and Engineering, Mar. 20, 2021, pp. 1-14.
"International Search Report (Form PCT/ISA/210) of PCT/CN2022/101099," dated Nov. 29, 2022, pp. 1-4.
"Written Opinion of the International Searching Authority (Form PCT/ISA/237) of PCT/CN2022/101099," dated Nov. 29, 2022, pp. 1-3.

* cited by examiner

METHOD FOR MERGING SURFACE SKIN THREE-DIMENSIONAL DATA

CROSS-REFERENCE TO RELATED APPLICATION

This application is a continuation of international PCT application serial no. PCT/CN2022/101099, filed on Jun. 24, 2022, which claims the priority benefit of China application no. 202210560489.2, filed on May 24, 2022. The entirety of each of the above mentioned patent applications is hereby incorporated by reference herein and made a part of this specification.

BACKGROUND

Technical Field

The disclosure belongs to the technical field of surface skin, and in particular, relates to a method for merging surface skin three-dimensional data.

Description of Related Art

The large curved skins of aircraft wings, fuselages, fairings, etc. are the main stressed components to maintain the aerodynamic performance of the aircraft. As such, unqualified manufacturing quality of the skin will cause potential safety hazards to the flight stability as well as the sealing of the internal structure of the aircraft. Therefore, how to accurately detect the geometric dimensions of the skin is critical to ensure the quality of skin manufacturing. At present, the method of skin detection is mainly based on manual detection, so deficiencies such as low precision, poor consistency and low efficiency can be found. How to automatically obtain the dense three-dimensional (3D) measurement data of the skin through the robot measurement system and then compare the 3D measurement data with the design model to detect the skin size provides a new idea for the high-precision and efficient detection of large skins.

Point cloud merging is a commonly used algorithm to automatically unify and compare 3D measurement data and design models into the same coordinate system. Generally, the overall distance between the two point clouds is made the shortest by solving the relative pose parameters between the two measured point cloud data. In the literature "Go-ICP: A globally optimal solution to 3D ICP point-set registration, IEEE Transactions on Pattern Analysis and Machine Intelligence, 2016, 38 (11): 2241-2254", a global Go-ICP merging algorithm is proposed. In this algorithm, the 3D motion space is searched by the branch-and-bound algorithm to optimize the initial pose, and finally the iterative closest point (ICP) merging algorithm is used for precise merging. In the literature "Registration of surfaces minimizing error propagation for a one-shot multi-slit hand-held scanner, Pattern Recognition, 2008, 41 (6): 2055-2067", the ICP matching method based on normal distance is mentioned. In this method, a local second-order convergence rate can be achieved. However, for the stretched surface skin, it is easy to cause the point cloud to slip along the tangent plane, and the merging error is thereby generated. The above two types of representative ICP-related improved algorithms are both based on Euclidean distance or normal distance to construct the objective function, but both ignore the influence of surface changes on distance calculation accuracy. As such, in the above two algorithms, the merging of large surface skins is more likely to cause surface merging errors. Another type of merging method is to construct a new objective function. For instance, in the literature "3DMNDT: 3D multi-view registration method based on the normal distributions transform, Computer Vision and Pattern Recognition, 2021,14(8): 1-12", a merging method based on normal distribution transformation (NDT) is proposed. In this method, the point cloud space is discretized into grid units, and each unit is expressed as the mean and covariance of the points in the grid. The probability of a point at a particular location is assumed to follow a normal distribution. The merging is then achieved by minimizing the NDT between the point clouds. Compared with ICP, this type of method is not sensitive to the initial value and does not need to find the closest point, so the merging efficiency can be greatly improved. However, the point cloud is simplified, so this method does not have the advantage of accuracy.

SUMMARY

In view of the above technical problems, the disclosure provides a method for merging surface skin three-dimensional (3D) data.

The disclosure provides a method for merging surface skin 3D data to act as the technical solution to solve the technical problems, and the method includes the following steps.

In step S100, actually-measured 3D data of a workpiece to be skinned and 3D data of a design model of the workpiece are constructed.

In step S200, a normal vector, a neighborhood radius, and a position of a sphere center of each point in the design model 3D data are calculated.

In step S300, closest points to the design model 3D data for all points in the actually-measured 3D data are found.

In step S400, a static closest distance and a dynamic closest distance from each point in the actually-measured 3D data to the corresponding closest point in the design model 3D data are calculated. Each of the static closest distance and the dynamic closest distance includes a Euclidean distance, a normal distance, and a surface adaptive distance calculated from the Euclidean distance and the normal distance.

In step S500, an objective function of the surface adaptive distance is constructed.

In step S600, the objective function is minimized, and a differential motion screw $\xi$ is calculated after the objective function is minimized.

In step S700, the actually-measured 3D data is updated based on the differential motion screw $\xi$, and the merging of the actually-measured 3D data and the design model 3D data are achieved.

Step S100 specifically includes the following steps.

In step S110, the workpiece to be skinned is scanned from a plurality of viewing angles, and a point cloud $X=\{x_1, x_2, \ldots, x_i, \ldots, x_m\}$ of the actually-measured 3D data including m points is obtained. Each point is a 3×1 vector.

In step S120, the design model is uniformly discretized, and a point cloud $Y=\{y_1, y_2, \ldots, y_i, \ldots, y_n\}$ of the design model 3D data including n points is obtained.

Further, the number of points m of the actually-measured 3D data and the number of points n of the design model 3D data in step S100 satisfy n>3m.

Further, step S200 specifically includes the following steps.

In step S210: for each point $y_i$ and i=1, n in the design model 3D data, k points closest to the point $y_i$ in the point cloud Y are searched to form a point set K={$k_1, k_2, \ldots, k_k$}, where the point set K⊆Y.

In step S220, least squares spherical surface fitting is performed on the point set K, and a sphere center $o_i$ and a radius $r_i$ are obtained. A unit normal vector of the point $y_i$ is $n_i=(o_i-x_i)/\|o_i-x_i\|$, where $x_i$ represents the points in the point cloud X in the actually-measured 3D data, and the point cloud Y corresponds to a normal vector set N={$n_1, n_2, n_3, \ldots, n_i, \ldots, n_n$} and a neighborhood radius set R={$r_1, r_2, r_3, \ldots, r_i, \ldots, r_n$}.

Further, the number of points in the point set K in the step S210 satisfies: 5<k<50.

Further, step S300 specifically is the following. The closest points in the point cloud Y of the design model 3D data are found for each measuring point $x_i$ in the point cloud X of the actually-measured 3D data. The closest point is denoted as $y_1'$, $y_i' \in Y$, a unit normal vector corresponding to $y_i'$ is $n_i'$, $n_1' \in N$, a corresponding neighborhood radius is $r_i'$, $r_i' \in R$, $y_i'$ forms the set Y'={$y_1', y_2', \ldots, y_i', \ldots, y_m'$} of the closest points, $n_i'$ forms the unit normal vector set N'={$n_1', n_2', \ldots, n_i', \ldots, n_m'$} of the closest points, and $r_i'$ forms the neighborhood radius set R'={$r_1', r_2', r_3', \ldots, r_i', \ldots, r_m'$} of the closest points. The points in the point cloud X are in one-to-one correspondence with the points in the closest point set Y', the normal vectors in the set N', and the radii in the set R'.

Further, step S400 specifically includes the following steps.

In step S410, for each measuring point $x_i$ in the point cloud X, the static closest distance from the measuring point $x_i$ to the point $y_i'$ is calculated, and three forms of distances, namely the Euclidean distance $d_{i\_e0}=\|x_i-y_i'\|$, the normal distance $d_{i\_n0}=(x_i-y_i')^T n_i'$, and a distance $d_{i\_r0}$ considering neighborhood feature reconstruction are included. The distance of the neighborhood feature reconstruction is the surface adaptive distance.

When a neighborhood of $x_i$ is a concave surface, $d_{i\_r0}=r_i'-\sqrt{r_i' \times r_i' - 2r_i' d_{i\_n0} + d_{i\_e0} \times d_{i\_e0}}$.

When the neighborhood of $x_i$ is a convex surface, $d_{i\_r0}=\sqrt{r_i' \times r_i' - 2r_i' d_{i\_n0} + d_{i\_e0} \times d_{i\_e0}} - r_i'$.

In step S420, for each measuring point $x_i$ in the point cloud X, the dynamic closest distance from the measuring point $x_i$ to the point cloud Y is calculated, a 6×1 differential motion screw is defined as $\xi$, where the updated position is $x_{i+}=x_i e^{[\xi]}$ when the differential motion screw $\xi$ is provided at the measuring point $x_i$, and the dynamic closest distance from the measuring point $x_{i+}$ to the point cloud Y is calculated. Three forms of distances, namely the Euclidean distance, the normal distance, and the distance considering the neighborhood feature reconstruction are included. The dynamic Euclidean distance may be expressed as $d_{i\_e}=\|x_i-y_i'+E_i\xi\|$, where $E_i=[I_{3\times3},-\hat{x}_i]$ is a 3×6 coefficient matrix, $I_{3\times3}$ represents a 3×3 unit matrix, and $\hat{x}_i$ represents an antisymmetric matrix of the point $x_i$. The dynamic normal distance may be expressed as $d_{i\_n}=d_{i\_n0}+N_i\xi$, where $N_i=[n_i^T,(x_i\times n_i)^T]$ is a 1×6 coefficient matrix. The superscript T denotes the transpose of the matrix.

A dynamic distance of a convex surface considering the neighborhood feature reconstruction is $d_{i\_r}=\sqrt{r_i' \times r_i' - 2r_i' d_{i\_n} + d_{i\_e}^2} - r_i'$.

A dynamic distance of a concave surface considering the neighborhood feature reconstruction is $d_{i\_r}=r_i'-\sqrt{r_i' \times r_i' - 2r_i' d_{i\_n} + d_{i\_e}^2}$.

Further, step S500 specifically is the following. The objective function is $$F = \sum_{i=1}^{n} d_{i\_r}^2,$$

and second-order Taylor expansion is performed on the objective function expressed as $$F = \sum_{i=1}^{n} \left(d_{i\_r0}^2 + 2R_i\xi + \xi^T (E_i^T E_i)\xi\right),$$

where $R_i=r_i'N_i+(x_i-y_i')^T E_i$.

Further, step S700 specifically is the following. The point cloud X of the actually-measured 3D data is updated by means of the differential motion screw $\xi$ and the formula $x_i'=x_i e^{[\xi]}$ where $x_i'$ represents an $i^{th}$ point on the updated point cloud X, and i=1, 2, ..., m. The merging of the actually-measured 3D data and the design model 3D data is achieved, and the updated point cloud X is the stitched actually-measured 3D data.

Further, the method for merging the surface skin 3D data further includes the following steps.

In step S800: the closest points in the design model 3D data corresponding to all points of the updated actually-measured 3D data are found, and a mean square error among the points is calculated.

In step S900, it is determined whether the mean square error is less than a given error, steps S300 to S900 are repeated if the mean square error is greater than or equal to the given error, the stitched actually-measured 3D data is outputted if the mean square error is less than the given error, and the merging is completed.

Beneficial effects provided by the disclosure include the following.

1. In the disclosure, by assuming that the neighborhood of the closest point is a sphere, the static and dynamic closest distance metrics from the measuring point to the surface point cloud during the differential motion are obtained. Regardless of whether the skin is a strongly distorted shape or a flat shape, an accurate and reasonable closest distance from the measuring point to the point cloud of the skin surface can be obtained.

This adaptive distance metric is different from the Euclidean and normal distances commonly used at present. The Euclidean and normal distances do not change as the neighborhood of the surface changes. However, the surface adaptive distance takes into account the differences in distance metrics caused by changes in the shape of the surface. For instance, when the skin is a highly distorted complex surface such as a nose, the adaptive distance of the surface will be equivalent to the Euclidean distance, so the measurement error of the normal distance caused by the sudden change of the normal vector in the strongly distorted area can be reduced. When the skin is a flat surface such as a wing, the adaptive distance of the surface will be equivalent to the normal distance, so the inaccurate judgment and measurement error of the closest distance caused by the sparse point cloud of the Euclidean distance in the flat area can be reduced. Therefore, it can be widely used in the detection of different types of large surfaces such as wings, fuselages, noses, and fairings.

2. In the disclosure, the objective function of point cloud merging based on the surface adaptive distance is defined, so the convergence speed and convergence stability can be well considered in the merging process. During the initial merging, the distance between the measuring points and the model is relatively large. Since the surface adaptive distance metric includes normal and tangential components, the point cloud merging method can constrain the movement direction of the measurement data in both the normal and tangential directions. In this way, the long-distance convergence stability is ensured, and the phenomenon of tangential slipping along the skin that is easily caused by the conventional ICP merging method based on the normal distance is prevented from occurring. The merging method has second-order fast convergence speed when merging at close distances. In this way, the problem of low speed caused by the first-order convergence of the conventional ICP merging method based on the Euclidean distance is prevented from occurring, and this method is well applicable to the merging of large-scale point cloud data such as large skins. Therefore, this method is convenient for practical applications.

3. For the merging of one design model and multiple skins, when calculating the normal vector and the neighborhood radius of the surface, it is only necessary to calculate the normal vector and the neighborhood radius of the design model once, and there is no need to calculate the normal vector and the neighborhood radius of the measurement data containing a lot of noise. Therefore, higher calculation accuracy and calculation efficiency can be ensured.

4. The stitched pose and the stitched 3D measurement data obtained according to the disclosure may be used to extract the surface error of the skin, and thus the detection of the processing quality of the skin is completed. For instance, the disclosure can be used to improve the milling quality of fuselage profiles. Based on the stitched results of the fuselage measurement data and the design model, the surface error of each part of the fuselage can be calculated, and the machining allowance in the milling process of the fuselage can be adjusted accordingly, so the quality of the skin surface is improved. In the disclosure, multiple locations can be selected for the 3D measurement data. The measurement data of each part can be stitched together to obtain the profile error of each part of interest, thereby guiding the actual production.

Different from the fusion used in other methods, the precise merging method provided by the disclosure is relatively independent and can be combined with the existing intelligent global merging method to obtain improved merging performance. For instance, this merging method can be combined with the branch-and-bound (BnB) algorithm, and through the BnB algorithm, a global initial pose is given to this method, so the stability and global merging in the case of coarse noise can be achieved. Therefore, this method has strong generalization performance.

DESCRIPTION OF THE EMBODIMENTS

In order to enable a person having ordinary skill in the art to better understand the technical solutions of the disclosure, the disclosure will be further described in detail below together with the accompanying drawings.

First Embodiment

Figure 1:
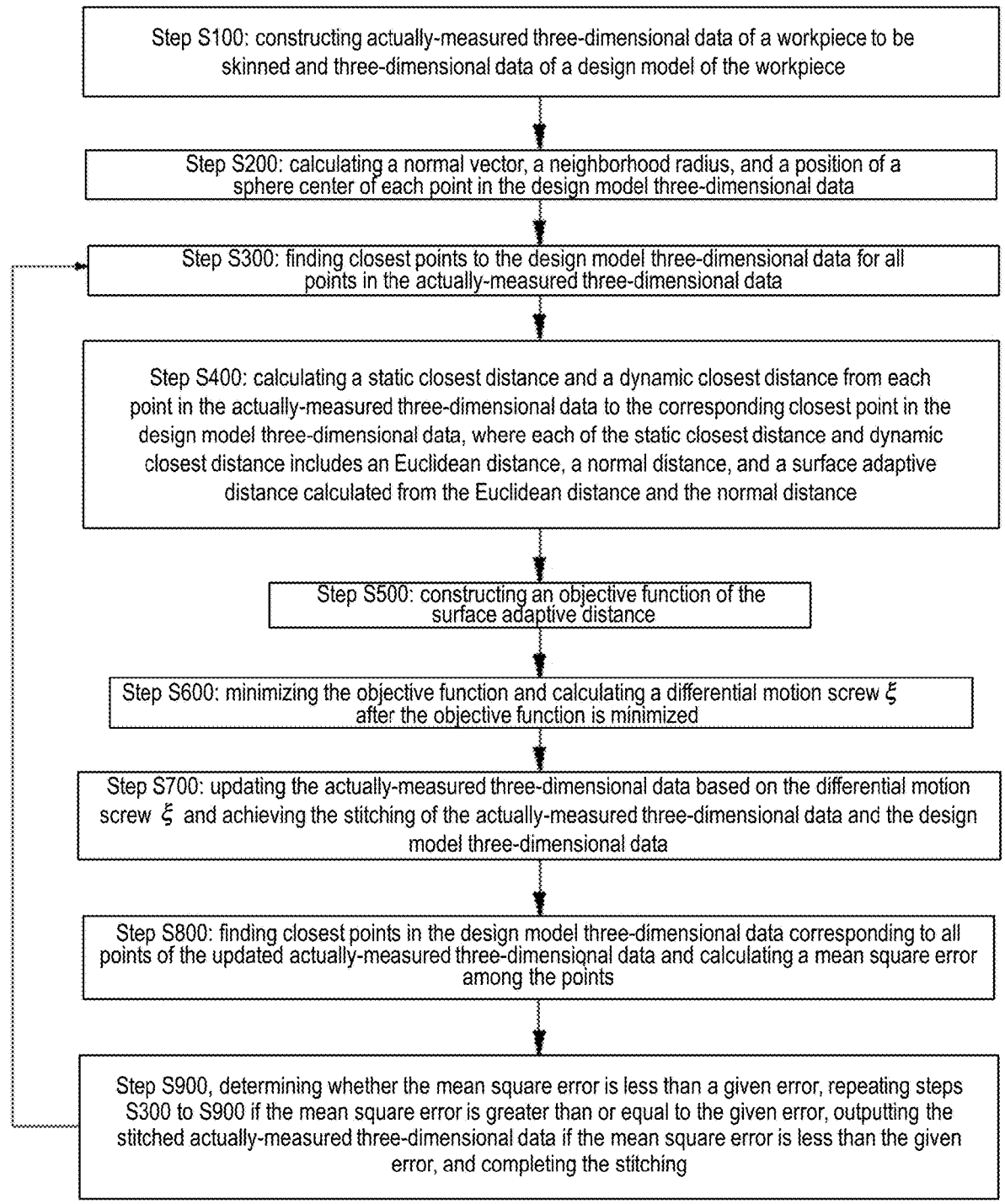
FIG. 1 is a flow chart of merging surface skin three-dimensional (3D) measurement data according to the disclosure.
Figure 2:
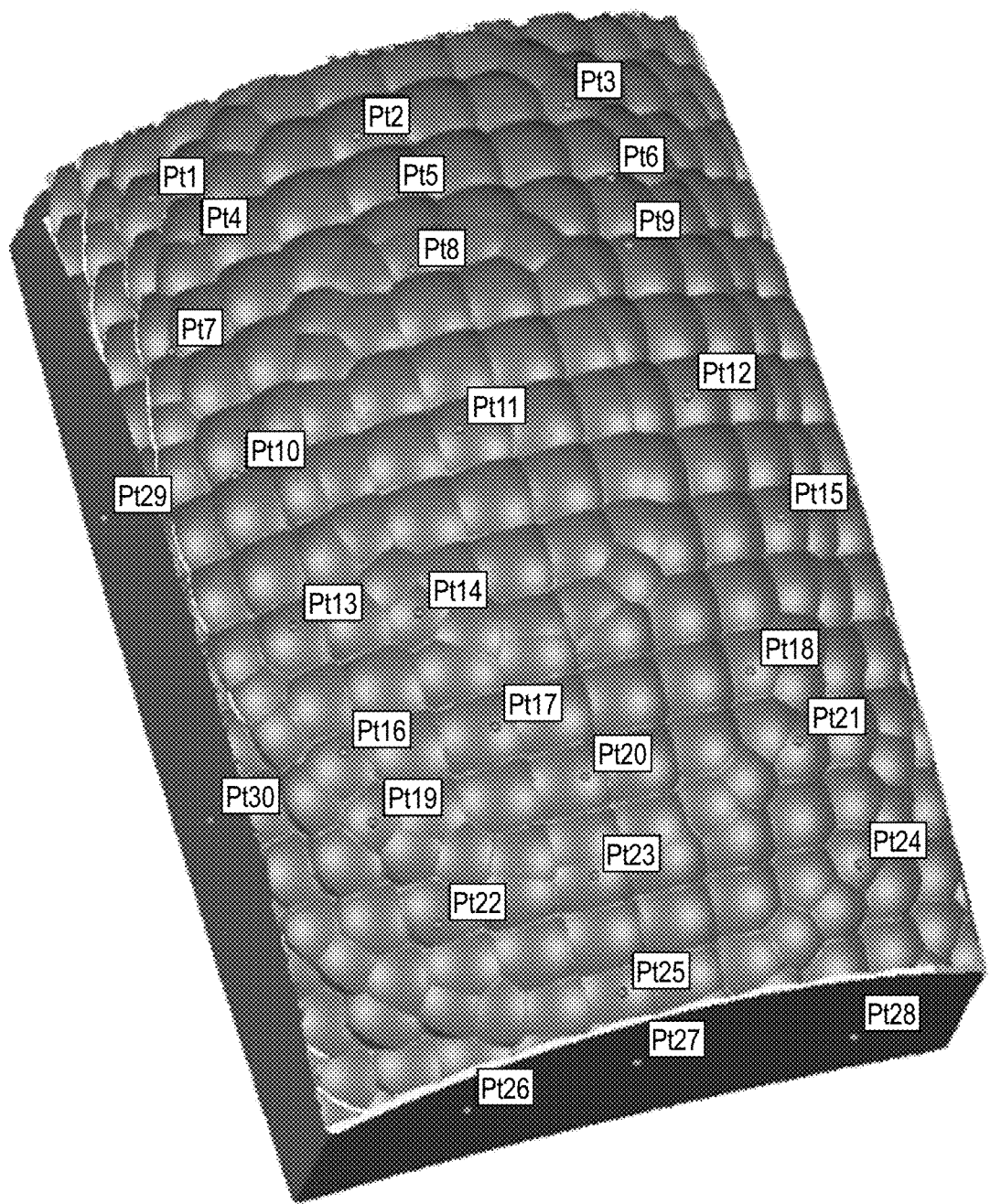
FIG. 2 is a schematic diagram of a complex thin-walled surface.

Hereinafter, the disclosure is going to be described in detail by taking FIG. 2 as an example. With reference to FIG. 1, the embodiments of the disclosure provide a method for merging surface skin three-dimensional (3D) data including the following steps.

In step S100, actually-measured 3D data of a workpiece to be skinned and 3D data of a design model of the workpiece are constructed.

In step S200, a normal vector, a neighborhood radius, and a position of a sphere center of each point in the design model 3D data are calculated.

In step S300, closest points to the design model 3D data for all points in the actually-measured 3D data are found.

In step S400, a static closest distance and a dynamic closest distance from each point in the actually-measured 3D data to the corresponding closest point in the design model 3D data are calculated. Each of the static closest distance and the dynamic closest distance includes a Euclidean distance, a normal distance, and a surface adaptive distance calculated from the Euclidean distance and the normal distance.

In step S500, an objective function of the surface adaptive distance is constructed.

In step S600, the objective function is minimized, and a differential motion screw $\xi$ is calculated after the objective function is minimized.

In step S700, the actually-measured 3D data is updated based on the differential motion screw $\xi$, and the merging of the actually-measured 3D data and the design model 3D data are achieved.

Step S100 specifically includes the following steps.

In step S110, the workpiece to be skinned is scanned from a plurality of viewing angles, and a point cloud $X=\{x_1, x_2, \ldots, x_i, \ldots, x_m\}$ of the actually-measured 3D data including m points is obtained. The number of points m is 48,542, a point cloud spacing is 0.03 mm; and each point is a 3×1 vector.

In step S120, the design model is uniformly discretized, and a point cloud $Y=\{y_1, y_2, \ldots, y_i, \ldots, y_m\}$ of the design model 3D data including n points is obtained. The number of points n is 240,959, and the point cloud spacing is 0.01 mm.

The number of points m of the actually-measured 3D data and the number of points n of the design model 3D data in step S100 satisfy n>3m.

Step S200 specifically includes the following steps.

In step S210, for each point $y_i$ and i=1, n in the design model 3D data, a neighborhood search algorithm such as KNN is used to search k=13 points closest to the point $y_i$ in the point cloud Y to form a point set $K=\{k_1, k_2, \ldots, k_{13}\}$, where the point set $K \subseteq Y$.

In step S220, least squares spherical fitting is performed on the point set K. The least squares method is used to perform spherical fitting of the point set K by the least squares method. The objective function of spherical fitting is $$\min \sum_{j=1}^{13}(\|k_j - o_i\| - r_i)^2.$$

where $o_i$ is the 3×1 sphere center and $r_i$ is the radius. After fitting, the position of the sphere center $o_i$ and the radius $r_i$ of the sphere may be obtained. A unit normal vector of point $y_i$ is $n_i=(o_i-x_i)/\|o_i-x_i\|$, where $x_i$ represents the point in point cloud X of the actually-measured 3D data. The point cloud Y corresponds to a normal vector set $N=\{n_1, n_2, n_3, \ldots, n_i, \ldots, n_n\}$ and a neighborhood radius set $R=\{r_1, r_2, r_3, \ldots, r_i, \ldots, r_n\}$. The positions of the sphere centers and the radii corresponding to the measuring points marked in FIG. 2 are shown in Table 1.

TABLE 1

| Point Number | Position of Sphere Center | Radius |
|---|---|---|
| 1 | −19.37, −25.35, 280.00 | 9774.52 |
| 2 | −13.09, 41.68, 280.00 | 8390.49 |
| 3 | 31.59, 71.02, 280.00 | 5523.10 |
| 4 | −13.34, −51.09, 254.45 | 12.73 |
| 5 | −5.14, 31.07, 232.46 | 33.27 |
| 6 | 37.12, 59.71, 227.74 | 105.08 |
| 7 | 65.86, 68.14, 229.58 | 17.79 |
| 8 | −21.11, −51.18, 211.81 | 9.32 |
| 9 | −6.18, 28.11, 187.10 | 37.38 |
| 10 | 53.01, 55.4598, 84.09 | 429.61 |
| 11 | −36.44, −50.94, 149.77 | 9.90 |
| 12 | −21.75, 7.01, 107.20 | 28.32 |
| 13 | 41.48, 39.66, 112.10 | 201.60 |
| 14 | −47.22, −49.48, 78.55 | 13.27 |
| 15 | 6.28, 26.63, 61.12 | 42.37 |
| 16 | 75.63, 27.91, 66.34 | 14.67 |
| 17 | −54.42, −44.85, 23.73 | 19.11 |
| 18 | −35.98, −9.95, 19.42 | 66.08 |
| 19 | 23.95, 25.97, 16.49 | 72.83 |
| 20 | 76.02, 18.32, 16.56 | 12.74 |
| 21 | −31.20, 1.80, 2.78 | 9.24 |
| 22 | 40.65, 21.96, 1.60 | 9.96 |
| 23 | 15.78, −10.62, −0.00 | 153.70 |
| 24 | −9.82, −55.00, 0.00 | 5.23 |
| 25 | 48.42, −55.00, 0.00 | 3.78 |
| 26 | −30.82, −55.00, −9.19 | 852.51 |
| 27 | 47.10, −55.00, −8.66 | 899.17 |
| 28 | 9.82, −39.28, −31.33 | 92.84 |
| 29 | 8.68, −24.28, −48.25 | 46.40 |
| 30 | 50.23, −19.29, −45.00 | 39.59 |

The number of points in the point set K in the step S210 satisfies: 5<k<50.

Step S300 specifically is the following. Methods such as a binary tree method, an octree method, or a K-dimensional tree (KD-tree) search algorithm method is used to find the closest points in the point cloud Y of the design model 3D data for each measuring point $x_i$ in the point cloud X of the actually-measured 3D data. The closest points are denoted as $y_i'$, $y_i' \in Y$, a unit normal vector corresponding to $y_i'$ is $n_i'$, $n_i' \in N$, a corresponding neighborhood radius is $r_i'$, $r_i' \in R$, and the normal vector $n_j$ and the radius $r_j$ correspond to the point $y_j$. Let $y_i'=y_j$, $n_i'=n_j$, and $r_i'=r_j$; then $y_i'$ forms a set of the closest points $Y'=\{y_1', y_2', \ldots, y_i', \ldots, y_m'\}$. Each of the points in the cloud point X is in one-to-one correspondence with the points in the closest point set Y'. $N'=\{n_1', n_2', \ldots, n_m'\}$ is a normal vector set of the closest points, and $R'=\{r_1', r_2', \ldots, r_m'\}$ is a neighborhood radius set of the closest points. The elements in the normal vector set and the neighborhood radius set are in one-to-one correspondence with to the points in the measurement data.

Step S400 specifically includes the following steps.

In step S410, for each measuring point $x_i$ in the point cloud X, the static closest distance from the measuring point $x_i$ to the point $y_i'$ is calculated, and three forms of distances, namely the Euclidean distance $d_{i\_e0}=\|x_i-y_i'\|$, the normal distance $d_{i\_n0}=(x_i-y_i')^T n_i'$, and a distance $d_{i\_r0}$ considering neighborhood feature reconstruction are included. The distance of the neighborhood feature reconstruction is the surface adaptive distance.

When a neighborhood of $x_i$ is a concave surface, $d_{i\_r0}=r_i'-\sqrt{r_i' \times r_i' - 2r_i'd_{i\_n0}+d_{i\_e0} \times d_{i\_e0}}$.

When the neighborhood of $x_i$ is a convex surface, $d_{i\_r0}=\sqrt{r_i' \times r_i' - 2r_i'd_{i\_n0}+d_{i\_e0} \times d_{i\_e0}}-r_i'$.

In step S420, for each measuring point $x_i$ in the point cloud X, the dynamic closest distance from the measuring point $x_i$ to the point cloud Y is calculated, a 6×1 differential motion screw is defined as $\xi$, where the updated position is $x_{i+}=x_i e^{[\xi]}$ when the differential motion screw $\xi$ is provided at the measuring point $x_i$, and the dynamic closest distance from the measuring point $x_{i+}$ to the point cloud Y is calculated. Three forms of distances, namely the Euclidean distance, the normal distance, and the distance considering the neighborhood feature reconstruction are included. The dynamic Euclidean distance may be expressed as $d_{i\_e}=\|x_i-y_i'+E_i\xi\|$, where $E_i=[I_{3\times3},-\hat{x}_i]$ is a 3×6 coefficient matrix, $I_{3\times3}$ represents a 3×3 unit matrix, and $\hat{x}_i$ represents an antisymmetric matrix $$\hat{x}_i = \begin{bmatrix} 0 & -w_i & v_i \\ w_i & 0 & -u_i \\ -v_i & u_i & 0 \end{bmatrix}$$

of the point $x_i=[u_i, v_i, w_i]^T$. The dynamic normal distance may be expressed as $d_{i\_n}=d_{i\_n0}+N_i\xi$, where $N_i=[n_i^T,(x_i \times n_i)^T]$ is a 1×6 coefficient matrix.

A dynamic distance considering the neighborhood feature reconstruction is $d_{i\_r}=r_i'-\sqrt{r_i' \times r_i' - 2r_i'd_{i\_n}+d_{i\_e}}$.

Step S500 specifically is the following. The objective function is $$F = \sum_{i=1}^{n} d_{i\_r}^2,$$

and second-order Taylor expansion is performed on the objective function expressed as $$F = \sum_{i=1}^{n} \left(d_{i\_r0}^2 + 2R_i\xi + \xi^T\left(E_i^T E_i\right)\xi\right),$$

where $R_i=r_i'N_i+(x_i-y_i')^T E_i$.

Step S700 specifically is the following.

According to the point cloud X, the closest point data Y', the unit normal vector set N' of the closest points, and the neighborhood radius set R' of the closest points, F is minimized, the differential motion screw $\xi$ in step S600 is solved, and the merging of the 3D data is achieved.

$$\xi = -\left(\sum_{i=1}^{m} K_i\right)^{-1}\left(\sum_{i=1}^{m} b_i^T\right)$$

is denoted, where $$b_i = \left(1 - \frac{r_i'}{d_{i\_r0}}\right)R_i, \text{ and } K_i = \left(E_i^T E_i - \frac{r_i' E_i^T E_i}{d_{i\_r0}} + \frac{r_i' R_i^T R_i}{d_{i\_r0}^3}\right).$$

The point cloud X of the actually-measured 3D data is updated by means of the differential motion screw ξ and the formula $x_i' = x_i e^{[\xi]}$, where $x_i'$ represents an $i^{th}$ point on the updated point cloud X, and i=1, 2, . . . , m. The merging of the actually-measured 3D data and the design model 3D data is achieved, and the updated point cloud X is the stitched actually-measured 3D data.

Second Embodiment

The method for merging the surface skin 3D data further includes the following steps.

In step S800, the closest points in the model point set Y are calculated according to the points $x_i$ and i=1, 2, . . . , m in the cloud point X of the updated actually-measured 3D data in turn. The closest point is denoted as $y_i'$ and $y_i' \in Y$. The unit normal vector corresponding to $y_i'$ is $n_i' \in N$, and the corresponding neighborhood radius is $r_i' \in R$. $y_i'$ forms the set $Y' = \{y_1', y_2', \ldots, y_i', \ldots, y_m'\}$ of the closest points, $n_i'$ forms the unit normal vector set $N' = \{n_1', n_2', \ldots, n_i', \ldots, n_m'\}$ of the closest points, and $r_i'$ forms the neighborhood radius set $R' = \{r_1', r_2', r_3', \ldots, r_i', \ldots, r_m'\}$ of the closest points. The points in the measured point cloud X are in one-to-one correspondence with the points in the closest point set Y', the normal vectors in the set N', and the radii in the set R'.

The mean square error among the points is calculated:

$$\text{mean square error } std = \sqrt{\frac{\sum_{i=1}^{m}(d_{i\_r0} - \bar{d})^2}{m}},$$

where $$\bar{d} = \sum_{i=1}^{m} d_{i\_r0}/m.$$

In step S900, it is determined whether the mean square error is less than a given error, steps S300 to S900 are repeated if the mean square error is greater than or equal to the given error, the stitched actually-measured 3D data is outputted if the mean square error is less than the given error (e.g., 0.05), and the merging is completed.

Figure 3:
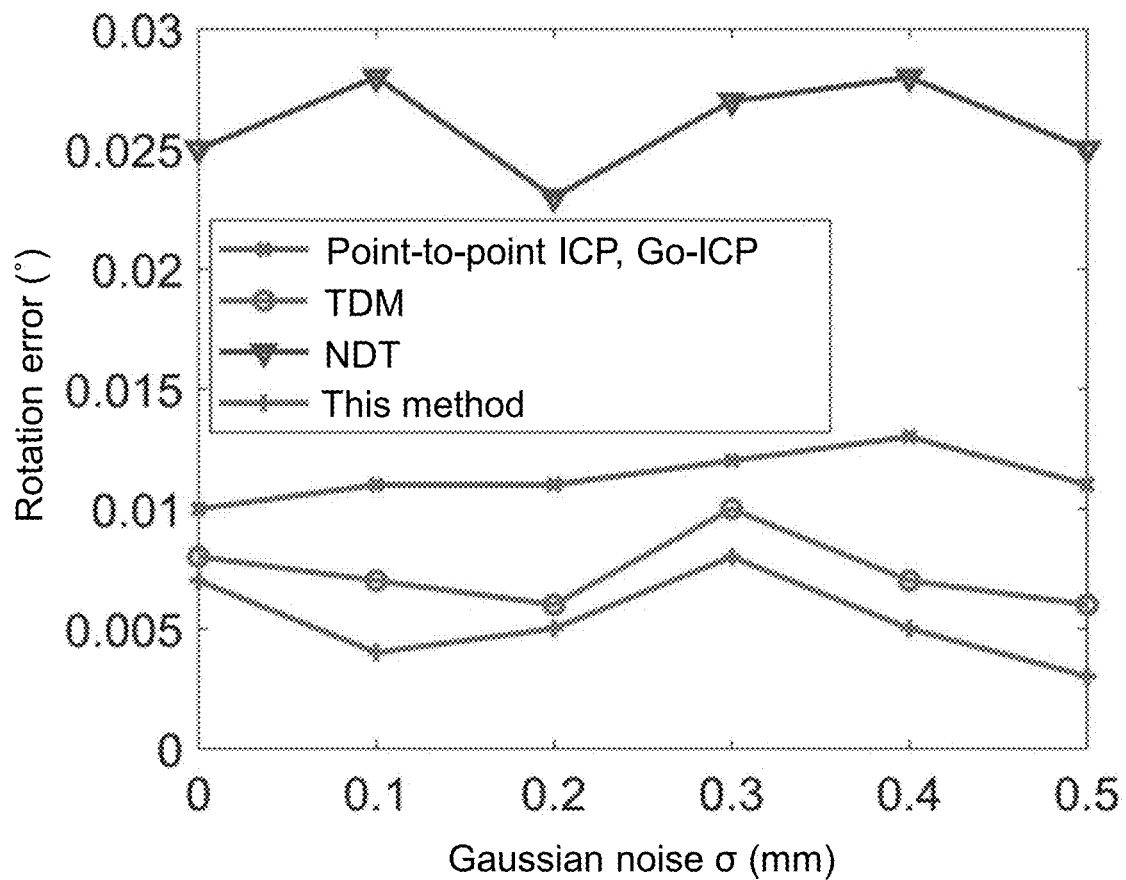
FIG. 3 shows comparison results of different merging methods; where NDT represents a matching method based on the normal distribution transformation, Go-ICP represents a globally optimal iterative closest point matching method, and the point-to-point ICP represents an iterative closest point matching method based on the point-to-point distance.

The results obtained through the calculation provided in this embodiment are shown in FIG. 3. FIG. 3 shows the comparison of merging rotation errors of different methods under different Gaussian noise conditions. Herein, both the ICP and Go-ICP merging methods are based on the Euclidean distance, the tangent distance minimization (TDM) merging method is based on the normal distance, and the NDT is merging based on the normal distribution transformation. As can be seen from the results that with the change of Gaussian noise, the merging rotation error of the method provided by the disclosure is the smallest.

In the disclosure, specific examples are used to illustrate the principles and implementation modes of the disclosure, and the descriptions of the above embodiments are only used to help understand the core idea of the disclosure. It should be pointed out that improvements and modifications can be made to the disclosure by a person having ordinary skill in the art without departing from the principle of the disclosure, and these improvements and modifications also fall within the protection scope of the claims of the disclosure.

What is claimed is:

1. A method for merging surface skin three-dimensional data, comprising:
    step S100: constructing actually-measured three-dimensional data of a workpiece to be skinned and three-dimensional data of a design model of the workpiece;
    step S200: calculating a normal vector, a neighborhood radius, and a position of a sphere center of each point in the design model three-dimensional data;
    step S300: finding closest points to the design model three-dimensional data for all points in the actually-measured three-dimensional data;
    step S400: calculating a static closest distance and a dynamic closest distance from each point in the actually-measured three-dimensional data to the corresponding closest point in the design model three-dimensional data, wherein each of the static closest distance and the dynamic closest distance comprises a Euclidean distance, a normal distance, and a surface adaptive distance calculated from the Euclidean distance and the normal distance;
    step S500: constructing an objective function of the surface adaptive distance;
    step S600 minimizing the objective function and calculating a differential motion screw ξ after the objective function is minimized; and
    step S700: updating the actually-measured three-dimensional data based on the differential motion screw ξ and achieving the merging of the actually-measured three-dimensional data and the design model three-dimensional data.

2. The method for merging the surface skin three-dimensional data according to claim 1, wherein step S100 specifically comprises the following steps:
    step S110: scanning the skin workpiece from a plurality of viewing angles and obtaining a point cloud $X = \{x_1, x_2, \ldots, x_i, \ldots, x_m\}$ of the actually-measured three-dimensional data comprising m points, wherein each point is a 3×1 vector; and
    step S120: uniformly discretizing the design model and obtaining a point cloud $Y = \{y_1, y_2, \ldots, y_i, \ldots, y_m\}$ of the design model three-dimensional data comprising n points, wherein each point is a 3×1 vector.

3. The method for merging the surface skin three-dimensional data according to claim 2, wherein the number of points m of the actually-measured three-dimensional data and the number of points n of the design model three-dimensional data in step S100 satisfy n>3m.

4. The method for merging the surface skin three-dimensional data according to claim 3, further comprising:
    step S800: finding the closest points in the design model three-dimensional data corresponding to all points of the updated actually-measured three-dimensional data and calculating a mean square error among the points; and
    step S900, determining whether the mean square error is less than a given error, repeating steps S300 to S900 if the mean square error is greater than or equal to the given error, outputting the stitched actually-measured three-dimensional data if the mean square error is less than the given error, and completing the merging.

5. The method for merging the surface skin three-dimensional data according to claim 2, wherein step S200 specifically comprises the following steps:

step S210: for each point $y_i$ and i=1, 2, . . . , n in the design model three-dimensional data, searching for k points closest to the point $y_i$ in the point cloud Y to form a point set K={$k_1$, $k_2$, . . . , $k_k$}, wherein the point set K⊆Y; and step S220: performing least squares spherical surface fitting on the point set K and obtaining a sphere center $o_i$ and a radius $r_i$; wherein a unit normal vector of the point $y_i$ is $n_i=(o_i-x_i)/\|o_i-x_i\|$, where $x_i$ represents the points in the point cloud X in the actually-measured three-dimensional data, and the point cloud Y corresponds to a normal vector set N={$n_1$,$n_2$,$n_3$, . . . , $n_i$, . . . ,$n_n$} and a neighborhood radius set R={$r_1$,$r_2$, $r_3$, . . . ,$r_i$, . . . ,$r_n$}.

6. The method for merging the surface skin three-dimensional data according to claim 5, wherein the number of points in the point set K in the step S210 satisfies: 5<k<50.

7. The method for merging the surface skin three-dimensional data according to claim 6, further comprising:

step S800: finding the closest points in the design model three-dimensional data corresponding to all points of the updated actually-measured three-dimensional data and calculating a mean square error among the points; and step S900, determining whether the mean square error is less than a given error, repeating steps S300 to S900 if the mean square error is greater than or equal to the given error, outputting the stitched actually-measured three-dimensional data if the mean square error is less than the given error, and completing the merging.

8. The method for merging the surface skin three-dimensional data according to claim 5, wherein step S300 specifically is: finding the closest points in the point cloud Y of the design model three-dimensional data for each measuring point $x_i$ in the point cloud X of the actually-measured three-dimensional data, wherein the closet points are denoted as $y_i'$, $y_i' \in Y$, a unit normal vector corresponding to $y_i'$ is $n_i'$, $n_i' \in N$, a corresponding neighborhood radius is $r_i'$, $r_i' \in R$, $y_i'$ forms a set Y'={$y_1'$, $y_2'$, . . . , $y_i'$, $y_m'$} of the closest points, $n_i'$ forms a unit normal vector set N'={$n_1'$, $n_2'$, . . . , $n_i'$, . . . , $n_m'$} of the closest points, $r_i'$ forms a neighborhood radius set R'={$r_1'$, $r_2'$, $r_3'$, . . . , $r_i'$, . . . , $r_m'$} of the closest points, and the points in the point cloud X are in one-to-one correspondence with the points in the closest point set Y', the normal vectors in the set N', and the radii in the set R'.

9. The method for merging the surface skin three-dimensional data according to claim 8, wherein step S400 specifically comprises the following steps:

step S410: for each measuring point $x_i$ in the point cloud X, calculating the static closest distance from the measuring point $x_i$ to the point $y_i'$, wherein three forms of distances, namely the Euclidean distance $d_{i\_e0}=\|x_i-y_i'\|$, the normal distance $d_{i\_n0}=(x_i-y_i')^T n_i'$, and a distance $d_{i\_r0}$ considering neighborhood feature reconstruction are comprised, and the distance of the neighborhood feature reconstruction is the surface adaptive distance, where when a neighborhood of $x_i$ is a concave surface, $d_{i\_r0}=r_i'-\sqrt{r_i'\times r_i'-2r_i'd_{i\_n0}+d_{i\_e0}\times d_{i\_e0}}$, and when the neighborhood of $x_i$ is a convex surface, $d_{i\_r0}=\sqrt{r_i'\times r_i'-2r_i'd_{i\_n0}+d_{i\_e0}\times d_{i\_e0}}-r_i'$; and step S420: for each measuring point $x_i$ in the point cloud X, calculating the dynamic closest distance from the measuring point $x_i$ to the point cloud Y, defining a 6×1 differential motion screw as $\xi$, wherein the updated position is $x_{i+}=x_i e^{[\xi]}$ when the differential motion screw $\xi$ is provided at the measuring point $x_i$, and calculating the dynamic closest distance from the measuring point $x_{i+}$ to the point cloud Y, wherein three forms of distances, namely the Euclidean distance, the normal distance, and the distance considering the neighborhood feature reconstruction are comprised; wherein the dynamic Euclidean distance is expressed as $d_{i\_e}=\|x_i-y_i'+E_i\xi\|$ where $E_i=[I_{3\times3},-\hat{x}_i]$ is a 3×6 coefficient matrix, $I_{3\times3}$ represents a 3×3 unit matrix, and $\hat{x}_i$ represents an antisymmetric matrix of the point xi, wherein the dynamic normal distance is expressed as $d_{i\_n}=d_{i\_n0}+N_i\xi$, where $N_i=[n_i^T,(x_i\times n_i)^T]$ is a 1×6 coefficient matrix, where a dynamic distance of a convex surface considering the neighborhood feature reconstruction is $d_{i\_r}=\sqrt{r_i'\times r_i'-2r_i'd_{i\_n}+d_{i\_e}^2}-r_i'$, and where a dynamic distance of a concave surface considering the neighborhood feature reconstruction is $d_{i\_r}=r_i'-\sqrt{r_i'\times r_i'-2r_i'd_{i\_n}+d_{i\_e}^2}$.

10. The method for merging the surface skin three-dimensional data according to claim 9, wherein step S500 specifically is: the objective function being $$F = \sum_{i=1}^{n} d_{i\_r}^2,$$

performing second-order Taylor expansion on the objective function expressed as $$F = \sum_{i=1}^{n} \left( d_{i\_r0}^2 + 2R_i\xi + \xi^T (E_i^T E_i)\xi \right),$$

where $R_i=r_i'N_i+(x_i-y_i')^T E_i$.

11. The method for merging the surface skin three-dimensional data according to claim 10, wherein step S700 specifically is: updating the point cloud X of the actually-measured three-dimensional data by means of the differential motion screw $\xi$ and the formula $x_i'=x_i e^{[\xi]}$, wherein $x_i'$ represents an $i^{th}$ point on the updated point cloud X, i=1, 2, . . . , m; and achieving the three-dimensional merging of the actually-measured three-dimensional data and the design model three-dimensional data, wherein the updated point cloud X is the stitched actually-measured three-dimensional data.

12. The method for merging the surface skin three-dimensional data according to claim 11, further comprising:

step S800: finding the closest points in the design model three-dimensional data corresponding to all points of the updated actually-measured three-dimensional data and calculating a mean square error among the points; and step S900, determining whether the mean square error is less than a given error, repeating steps S300 to S900 if the mean square error is greater than or equal to the given error, outputting the stitched actually-measured three-dimensional data if the mean square error is less than the given error, and completing the merging.

13. The method for merging the surface skin three-dimensional data according to claim 10, further comprising:

step S800: finding the closest points in the design model three-dimensional data corresponding to all points of the updated actually-measured three-dimensional data and calculating a mean square error among the points; and step S900, determining whether the mean square error is less than a given error, repeating steps S300 to S900 if the mean square error is greater than or equal to the given error, outputting the stitched actually-measured three-dimensional data if the mean square error is less than the given error, and completing the merging.

14. The method for merging the surface skin three-dimensional data according to claim 9, further comprising:

step S800: finding the closest points in the design model three-dimensional data corresponding to all points of the updated actually-measured three-dimensional data and calculating a mean square error among the points; and step S900, determining whether the mean square error is less than a given error, repeating steps S300 to S900 if the mean square error is greater than or equal to the given error, outputting the stitched actually-measured three-dimensional data if the mean square error is less than the given error, and completing the merging.

15. The method for merging the surface skin three-dimensional data according to claim 8, further comprising:

step S800: finding the closest points in the design model three-dimensional data corresponding to all points of the updated actually-measured three-dimensional data and calculating a mean square error among the points; and step S900, determining whether the mean square error is less than a given error, repeating steps S300 to S900 if the mean square error is greater than or equal to the given error, outputting the stitched actually-measured three-dimensional data if the mean square error is less than the given error, and completing the merging.

16. The method for merging the surface skin three-dimensional data according to claim 5, further comprising:

step S800: finding the closest points in the design model three-dimensional data corresponding to all points of the updated actually-measured three-dimensional data and calculating a mean square error among the points; and step S900, determining whether the mean square error is less than a given error, repeating steps S300 to S900 if the mean square error is greater than or equal to the given error, outputting the stitched actually-measured three-dimensional data if the mean square error is less than the given error, and completing the merging.

17. The method for merging the surface skin three-dimensional data according to claim 2, further comprising:

step S800: finding the closest points in the design model three-dimensional data corresponding to all points of the updated actually-measured three-dimensional data and calculating a mean square error among the points; and step S900, determining whether the mean square error is less than a given error, repeating steps S300 to S900 if the mean square error is greater than or equal to the given error, outputting the stitched actually-measured three-dimensional data if the mean square error is less than the given error, and completing the merging.

18. The method for merging the surface skin three-dimensional data according to claim 1, further comprising:

step S800: finding the closest points in the design model three-dimensional data corresponding to all points of the updated actually-measured three-dimensional data and calculating a mean square error among the points; and step S900, determining whether the mean square error is less than a given error, repeating steps S300 to S900 if the mean square error is greater than or equal to the given error, outputting the stitched actually-measured three-dimensional data if the mean square error is less than the given error, and completing the merging.

* * * * *